Sept. 4, 1956     A. C. STOVER     2,761,693
STABILIZING MEANS FOR VEHICLE STEERING AXLES
Filed Dec. 22, 1952     3 Sheets-Sheet 1

INVENTOR.
Ancil C. Stover.
BY
Whittemore, Hulbert & Belknap
ATTORNEYS

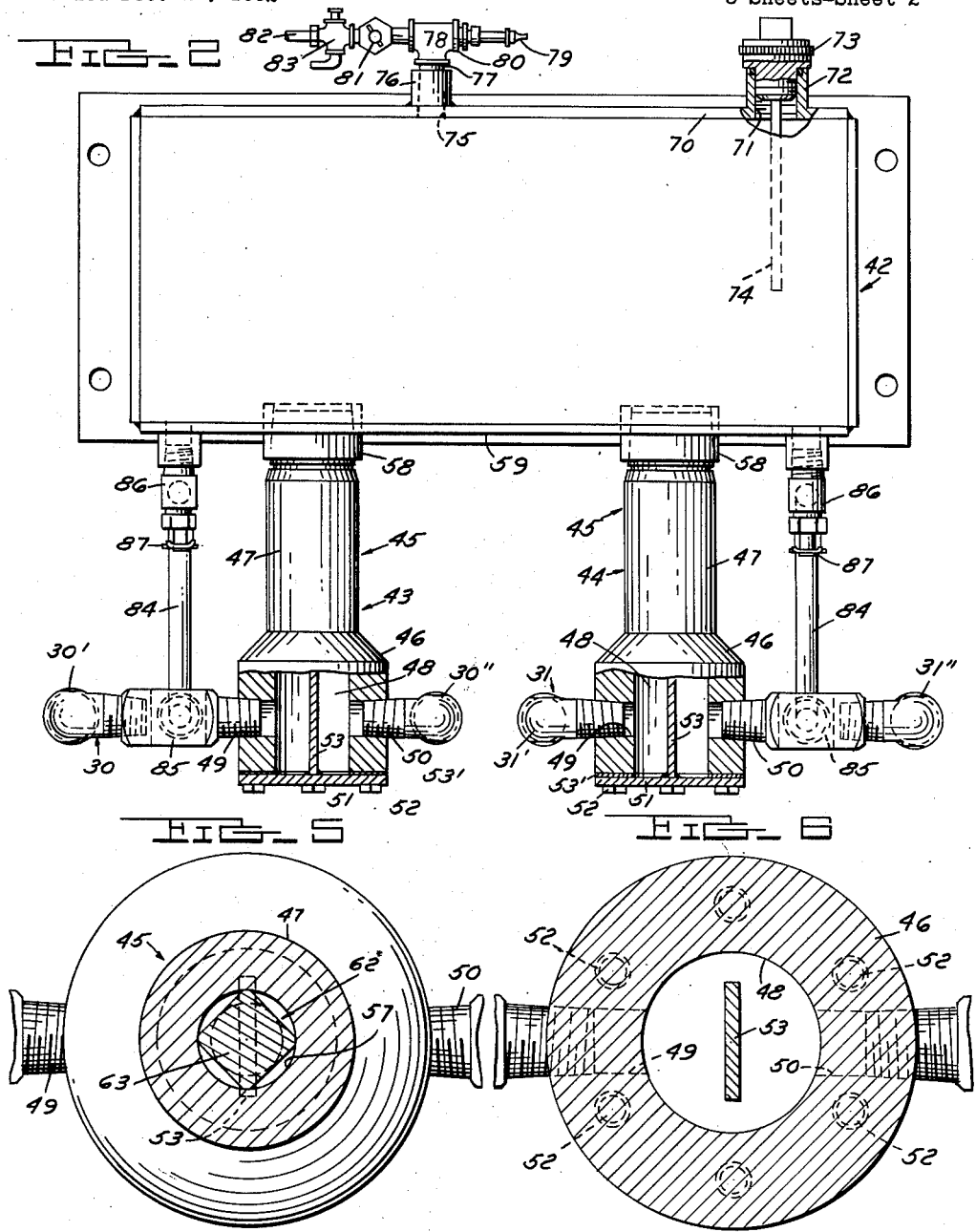

Sept. 4, 1956  A. C. STOVER  2,761,693
STABILIZING MEANS FOR VEHICLE STEERING AXLES
Filed Dec. 22, 1952  3 Sheets-Sheet 3
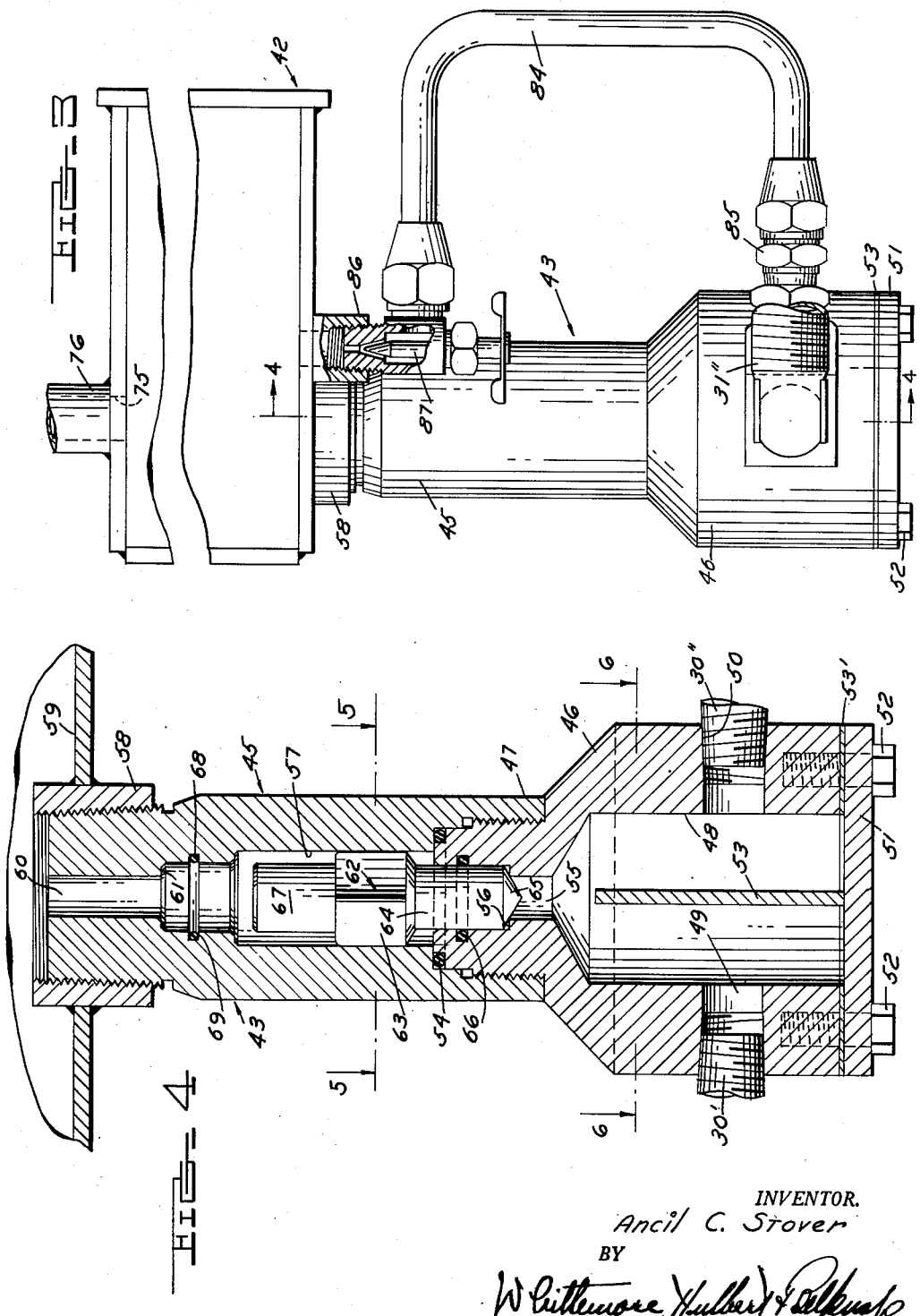
INVENTOR.
Ancil C. Stover
BY
Whittemore, Hulbert & Belknap
ATTORNEYS

United States Patent Office

2,761,693
Patented Sept. 4, 1956

2,761,693

STABILIZING MEANS FOR VEHICLE STEERING AXLES

Ancil C. Stover, Louisville, Ky., assignor to William W. Eisenhauer, William P. Ellwood, Ida J. Eisenhauer, and Leigh E. Eisenhauer, copartners doing business under the firm name of The Eisenhauer Manufacturing Company, Van Wert, Ohio Application December 22, 1952, Serial No. 327,231

14 Claims. (Cl. 280—81)

This invention relates to hydraulic stabilizing means for use in connection with vehicles having spaced pairs of ground engaging steering wheels.

The present invention finds particular use in connection with vehicles of the type having tandemly arranged axles supported for turning movement about substantially vertically extending axes. In vehicles of the above type it is desirable to stabilize the action of the axles so that turning movement of one axle in one direction insures a turning movement of a second axle in the opposite direction throughout approximately the same angle of travel as the first axle.

It has been proposed to stabilize the action of the turning axles by connecting the axles with a closed hydraulic system comprising a pair of double acting hydraulic cylinders and fluid lines or conduits respectively connecting the cylinders at opposite sides of the pistons therein. The pistons are respectively mechanically connected to the axles in a manner such that a turning thrust applied to one steering axle tending to turn the latter about a vertical axis is imparted to another turning axle tending to turn the latter axle about a second vertical axis in a direction opposite the first axle. Thus turns of relatively short radii may be easily negotiated regardless of the length of the vehicle, and at the same same the action of the running gear of the vehicle under severe road conditions is stabilized.

The effectiveness of the hydraulic displacement system to stabilize the action of the running gear under all conditions depends largely on whether or not the system can be kept free of air throughout continued use. Any air present in the hydraulic system would be compressed by forces transmitted by the ground engaging wheels to the pistons and hence would destroy the positive control necessary for successful operation of the vehicle.

With the above in view it is an object of this invention to provide means for expelling all air from the hydraulic system and thereby assure positive control of the tandem turning axles of the vehicle. More particularly, the present invention contemplates connecting the hydraulic system to a reservoir through the medium of air aspirating valves. The aspirating valves are respectively connected in opposite sides of the system and are operated by displacement of fluid in the system to expel air from the latter into the reservoir.

The foregoing as well as other objects will be made more apparent as this description proceeds especially when considered in connection with the accompanying drawings wherein—

Figure 2 is a side elevational view of a part of the stabilizing means;

Figure 3 is an end elevational view of the construction shown in Figure 2 and having certain parts broken away for the purpose of clarity;

Figure 4 is an enlarged longitudinal sectional view through one of the aspirating valves shown in Figure 2;

Figure 5 is a cross sectional view taken on the line 5—5 of Figure 4; and

Figure 6 is a cross sectional view taken on the line 6—6 of Figure 4.

Figure 1:
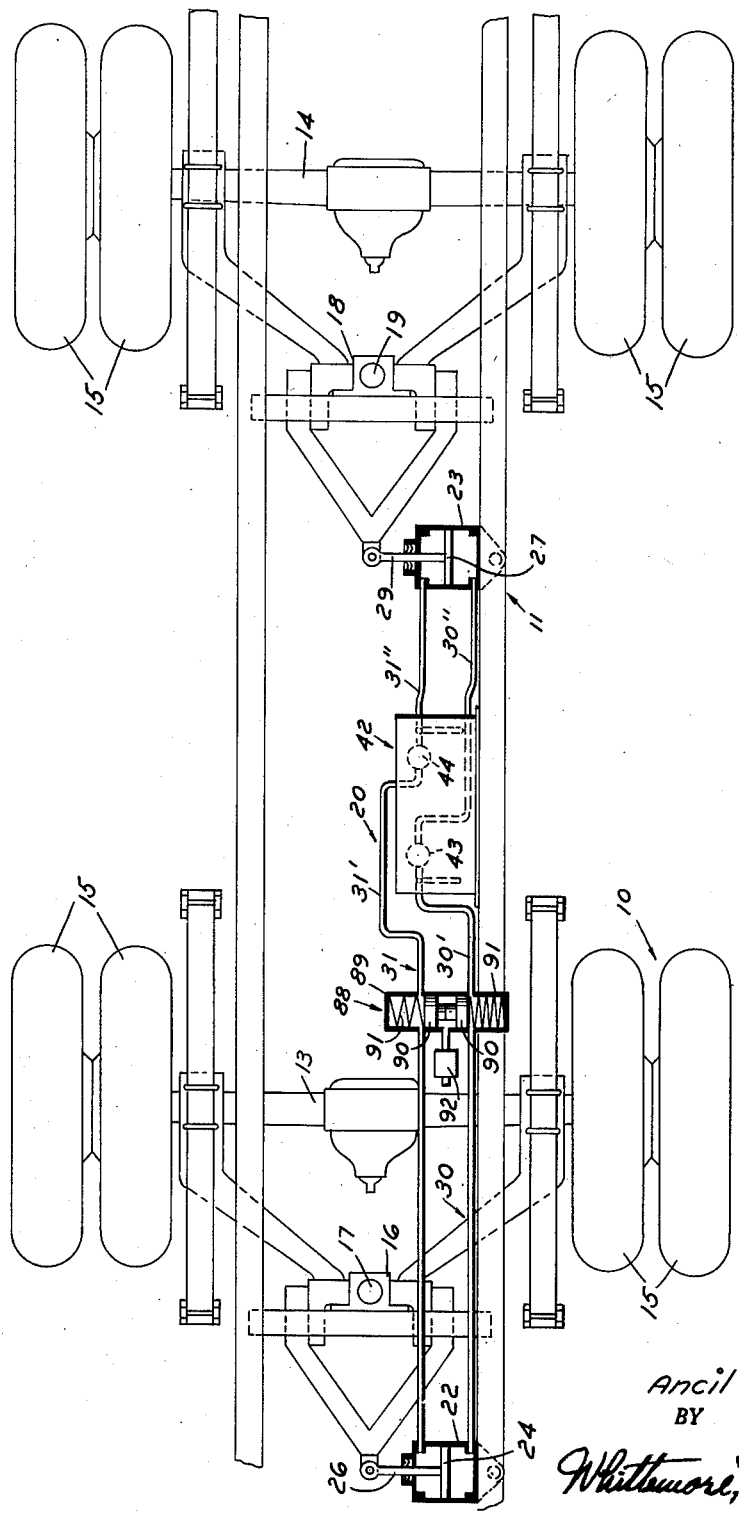
Figure 1 is a diagrammatic plan view of a vehicle having tandemly arranged steering axles and equipped with the stabilizing means embodying the features of this invention.

For the purpose of illustration, the present invention is shown in connection with a vehicle of the general type shown in my copending application, Ser. No. 119,222 filed October 3, 1949, now Patent 2,643,895. Such a vehicle is illustrated diagrammatically in Figure 1 and comprises an unsprung weight assembly 10 and a sprung weight assembly 11. The unsprung weight assembly 10 has tandemly arranged axles 13 and 14 spaced from one another longitudinally of the vehicle. Ground engaging wheels 15 are respectively mounted on opposite ends of the axles and suspension springs (not shown) are provided for connecting the axles to the sprung weight assembly 11.

The axle 13 is connected to an operating member 16 supported intermediate the ends thereof on the sprung weight assembly 11 at the front side of the axle 13 for turning movement about a vertical axis 17. The axle 14 is connected to a similar operating member 18 supported intermediate the ends thereof on the sprung weight assembly 11 at the front side of the axle 14 for turning movement about a vertical axis 19. The above construction is such that both axles are free to turn in opposite directions about their respective vertical axes 17 and 19.

In order to stabilize the turning movements of the axles about their respective vertical axes, a closed hydraulic system 20 is suitably mounted on the sprung weight of the vehicle. The hydraulic system 20 includes a pair of cylinders 22 and 23 respectively pivotally mounted on the sprung weight assembly 11 adjacent the operating members 16 and 18. The cylinder 22 is positioned with its axis extending in the direction of the axle 13 and a piston 24 is slidably supported within the cylinder 22. The piston 24 is connected to the operating member 16 by a rod 26 in a manner such that turning movement of the axle 13 in opposite directions about the axis 17 causes sliding movement of the piston 24 in opposite directions in the cylinder 22. The rod 26 projects through the inner end of the cylinder 22 and a suitable packing is provided to prevent the escape of fluid from the cylinder 22.

The cylinder 23 is positioned at the front side of the operating member 18 with its axis extending in the direction of the axle 14, and a piston 27 is slidably supported within the cylinder 23. The piston 27 has a connecting rod 29 which extends through the inner end of the cylinder 23 and is connected to the operating member 18 in a manner such that turning movement of the axle 14 in opposite directions about its axis 19 causes the piston 27 to slide in opposite directions in the cylinder 23. Suitable packing is also provided around the connecting rod 29 to prevent the escape of fluid from the cylinder 23. As shown in Figure 1 of the drawings a fluid conduit 30 connects the cylinder 22 at the outer side of the piston 24 to the cylinder 23 at the outer side of the piston 27 and a fluid conduit 31 connects the cylinder 22 at the inner side of the piston 24 to the cylinder 23 at the inner side of the piston 27.

The hydraulic system 20 is completely filled with a relatively non-compressible fluid and this fluid is supplied to the system 20 by a reservoir 42 suitably supported on the sprung weight assembly 11 of the vehicle. Before describing the specific construction of the reservoir and the manner in which the latter is connected to the hydraulic system 20, reference is made to the operation of the system thus far described. It will be apparent from Figure 1 of the drawings that the two axles are respectively turned about their vertical axes 17 and 19 by forces which are generated by the ground pressures acting upon the tires of the wheels 15. These forces may be the result of the normal steering of the vehicle around curves or they may result from any one of a number of different conditions that may be encountered during operation of the vehicle. The construction is such that under normal operating conditions where the inherent steering action, or the degree of directional stability is equal for each axle, little or no force is transmitted from one axle to the other through the hydraulic system 20. However, should the wheels on one or the other of said steering axles encounter unequal turning thrusts, the construction is such that a force applied to one axle tending to turn the latter in one direction about its vertical axis is transmitted through the displacement system 20 to the other axle tending to impart a turning movement to the latter axle in the opposite direction. Thus, the turning thrusts which are not the function of normal steering of the vehicle are balanced or nearly so by the hydraulic system 20 and directional stability is assured.

The foregoing action is required in order to exercise positive control of the steering axles and is accomplished providing the hydraulic system 20 is free of air. Should there be any appreciable amount of air present in the hydraulic system synchronous movement of the turning axles would be destroyed due to the fact that the air would be compressed and thereby affect the displacement required to obtain positive control of the steering axles.

In order to assure excluding air from the system 20 both sides 30 and 31 are respectively connected to the reservoir 42 by a pair of aspirating valves 43 and 44. As shown in Figure 4 of the drawings, the aspirating valve 43 has a body 45 formed of two parts 46 and 47. A receiving chamber 48 is formed in the bottom part 46 and diametrically opposed ports 49 and 50 extend through the side walls of the part 46. The port 49 is connected to one branch 30' of the fluid conduit 30 forming one side of the hydraulic displacement system 20 and the port 50 is connected to the other branch 30" of the fluid conduit 30. The lower end of the chamber is open and is normally closed by a removable cap 51 secured to the bottom of the part 46 by studs 52. A gasket 53' is interposed between the cap 51 and the bottom of the part 46 to prevent the escape of fluid from the chamber 48.

Inasmuch as the system 20 is completely filled with fluid, it follows that the chamber 48 is also filled with fluid and that displacement of fluid in the conduit or side 30 of the system 20 results in a movement of fluid through the chamber 48. Due to the velocity of flow of fluid through the conduit 30 during displacement, any air present in this side of the system tends to accumulate within the chamber 48 above the ports 49 and 50. This action is facilitated by providing the cap 51 with a baffle 53 which extends upwardly from the cap 51 into the chamber 48. As shown in Figure 4 of the drawings the baffle 53 is centrally located in the chamber 48 midway between the ports 49 and 50 in a position such that fluid entering the chamber 48 through either of said ports is deflected by the baffle 53. The resulting opposition to flow of fluid directly from one port to the other assists air in the side 30 of the system to pass upwardly in the chamber 48 and become trapped at the top of the latter chamber.

Referring again to Figure 4 of the drawings it will be noted that the top of the part 46 is reduced and is externally threaded to threadably engage the lower end of the body part 47. An O-ring type seal 54 is provided between the reduced portion of the part 46 and the adjacent inner surface of the part 47 to establish a fluid tight seal therebetween. The reduced portion of the part 46 has a vertically extending passage 55 centrally disposed with respect to the chamber 48 and reduced in diameter at the lower end to form an annular seat 56 intermediate the ends thereof. The upper end of the passage 55 opens into the bottom of a vertically extending circular transfer chamber 57 formed in the body part 47 and communicating with the interior of the reservoir 42. In detail the upper end of the body part 47 is threaded into a coupling 58 which is located within an opening formed in the bottom wall 59 of the reservoir 42 and is welded or otherwise secured to the wall 59. A vertically extending passage 60 is formed in the upper end of the body part 47 and connects the transfer chamber 57 to the interior of the reservoir. The passage 60 is aligned with the passage 55 and is enlarged at the lower end to provide an annular seat 61 intermediate the ends thereof.

Supported within the chamber 57 for vertical sliding movement is a plunger 62 having an enlargement 63 intermediate the ends polygonally shaped in cross section, as shown in Figure 5 of the drawings. The corners of the enlargement 63 are rounded to have a bearing engagement with the inner surface of the chamber 57 and the faces of the enlargement between the corners cooperate with the inner surface of the chamber 57 to form vertical passages for fluid. The lower end 64 of the plunger 62 is shaped to have a sliding fit in the upper enlarged end of the vertical passage 55, and terminates in a conical end surface 65 adapted to engage the seat 56 in the normal or lowermost position of the valve plunger 62. An O-ring type seal 66 is supported within an annular groove formed in the inner surface of the passage 55 in a position to establish a fluid tight seal with the end 64 of the valve plunger 62 in its normal or lowermost position.

The upper portion 67 of the valve plunger 62 is shaped to have a sliding fit in the enlarged lower end of the vertical passage 60 and the upper end of the portion 67 is engageable with the annular seat 61 in the passage 60 to limit the extent of upward displacement of the plunger 62. An O-ring type seal 68 is supported within an annular groove 69 formed in the enlarged lower end of the passage 60 in a position to engage the upper end portion 67 of the valve plunger to establish a fluid tight seal.

The valve plunger 62 is in its normal position shown in Figure 4 when there is no displacement of fluid in the side 30 of the system 20. In this normal position of the valve plunger 62, the lower end 64 projects into the passage 55 and the conical end 65 of the plunger engages the seat 56 to close communication between the receiving chamber 48 and the transfer chamber 57. Also in this normal position of the valve plunger 62, the upper portion 67 is spaced below the passage 60 to establish communication between the transfer chamber 57 and the interior of the reservoir 42.

When the valve plunger 62 is in the above mentioned normal position and fluid is displaced within the conduit or side 30 of the system 20 for any reason, an upward thrust is exerted on the valve plunger sufficient to raise the latter to its uppermost position. As the valve plunger 62 moves to its uppermost position, the lower end 64 leaves the enlarged upper end of the passage 55 and the top portion 67 of the plunger projects into the enlarged lower end of the passage 60. Hence, the chamber 48 is open to communication to the transfer chamber 57 and communication between the latter and reservoir 42 is closed. Any air trapped in the chamber 48 passes upwardly through the passage 55 into the chamber 57 and is replaced by oil or non-compressible fluid previously admitted to the chamber 57 in the normal position of the valve plunger 62.

When the hydraulic system 20 returns to a condition of equilibrium the valve plunger 62 returns to its normal or lowermost position allowing any air previously admitted to the chamber 57 to pass upwardly into the reservoir. It follows from the above that the aspirating valve 43 functions each time fluid is displaced in the conduit or side 30 of the system 20 to expel any air that may be present in the side 30 of the system 20.

The valve plunger 62 is of such construction that in intermediate positions, the opposite ends of the plunger respectively remain in the passages 55 and 60 so that at no point in the stroke of the plunger 62 is it possible for hydraulic fluid to bypass the plunger. Thus, the volume of hydraulic fluid required to operate the plunger 62 cannot exceed the displacement of the valve plunger and this displacement is very small in comparison to the displacement of the pistons in the system 20. Consequently, very little movement of the pistons is required to actuate the valve plunger 62.

The aspirating valve 44 is identical in construction to the valve 43 and hence the same reference numerals are used to indicate corresponding parts of the two valves. It is to be noted, however, that the aspirating valve 44 connects the branches 31' and 31'' of the conduit 31 forming the opposite side of the system 20. The operation of the aspirating valve 44 to expel air from the side 31 of the system upon displacement of hydraulic fluid in the latter side of the system is the same as the operation of the valve 43 previously described.

Referring now more in detail to the reservoir 42 it will be noted that the top wall 70 is fashioned with an opening 71 through which hydraulic fluid may be introduced into the reservoir. A sleeve 72 is welded or otherwise suitably secured to the top wall 70 in alignment with the opening 71 and is internally threaded to threadably engage a cap 73. The cap 73 coacts with the upper end of the sleeve 72 to seal the interior of the reservoir from the atmosphere. The numeral 74 designates a suitable dip stick secured in any suitable manner at the upper end to the cap 73 and adapted to indicate the level of the hydraulic fluid within the reservoir 42.

The hydraulic fluid contained in the reservoir 42 is maintained under pressure somewhat above atmospheric and in order to accomplish this result air under pressure is introduced into the reservoir 42 through an opening 75 in the top wall 70. As shown in Figure 2 of the drawings, a sleeve 76 is welded or otherwise suitably secured to the top wall 70 in alignment with the opening 75 and is internally threaded at the upper end to receive a nipple 77. A pipe T 78 is secured to the nipple 77 and one outlet of the pipe T 78 is connected to an air inlet valve 79 through the medium of a nipple 80. The other outlet of the pipe T 78 is connected to an air supply line 82 through a pressure regulating valve 81 which is set to maintain the pressure within the reservoir 42 within the desired limits. Referring again to Figure 2 of the drawings a shut-off valve 83 is shown in the air supply line to enable closing the latter when desired.

It is preferred to maintain the hydraulic fluid in the reservoir 42 under pressure above atmospheric in order to render the aspirating valves 43 and 44 more responsive to displacement of hydraulic fluid in the system 20. Also by pressurizing the system 20 the pressure in the latter is prevented from dropping below atmospheric pressure and hence the seals around the piston rods will not be subjected to reversal of pressure. Thus, the tendency for air to leak into the system along the piston rods is reduced to a minimum and satisfactory operation is obtained even though the seals may become worn.

Referring again to Figures 2 and 3 of the drawings, it will be noted that provision is made for bypassing the aspirating valves during refilling of the reservoir 42. In detail the receiving chamber 48 of each aspirating valve is connected to the lower end of a bypass line 84 by means of the coupling 85 and the upper end of each bypass line 84 is connected to the reservoir by a fitting 86. Each fitting 86 is provided with a shut-off valve 87 and this valve is closed during the normal operation of the stabilizing means. However, when it is desired to refill the system 20 with hydraulic fluid through the reservoir 42, the valves 87 are opened in order to vent air from the systems to the reservoir.

The valves 87 are also useful for restoring volumetric balance to the system after refilling. Briefly, this is accomplished by supporting the vehicle on a flat surface and opening both of the valves 87 so that the system 20 is connected directly to the reservoir 42. The vehicle is then moved slowly ahead for a relatively short distance, say for example three or four feet, to enable the axles 13 and 14 to align themselves or in other words to enable the pistons in the system to move the required amount to place the system in balance or equilibrium. When this condition exists the bypass shut-off valves 87 are closed and the axles are in their proper positions with respect to the vehicle.

Under some conditions it may be advantageous to lock the axles 13 and 14 against turning movement and this may be accomplished by closing communication through the respective sides 30 and 31 of the hydraulic system 20. As shown in Figure 1 of the drawings, a valve 88 is provided for respectively closing communication through the conduits 30 and 31 of the hydraulic system. Briefly, the valve 88 comprises a casing 89 having the opposite ends respectively connected in the fluid conduits 30 and 31. A pair of valve plungers 90 are slidably supported in the casing 89 and are normally urged to their innermost positions shown in Figure 1 by suitable springs 91. When the plungers are in their innermost positions communication is established through the conduits 30 and 31, and communication between the latter conduits through the valve 88 is prevented by the two plungers. When it is desired to close communication through the respective conduits 30 and 31, the valve plungers 90 are moved outwardly against the action of the springs 91 to positions wherein they respectively close the conduits 30 and 31. Outward movement of the plungers 90 is accomplished by connecting the interior of the casing 89 between the valve plungers 90 to a source of fluid under pressure indicated by the numeral 92. It will be understood that when the valve plungers 90 are in their outermost positions displacement of hydraulic fluid in both sides of the system 20 is prevented so that the axles are locked against turning movement.

It follows from the foregoing that the vehicle disclosed herein embodies a suspension system which includes two steering axles 13 and 14 respectively supported for turning movement about substantially vertically extending axes 17 and 19. The substantially vertically extending axes 17 and 19 are spaced forwardly of the respective axles in a manner such that the ground engaging wheels associated with the respective axles will track with the front steering wheels (not shown) under normal operating conditions. In other words, the construction is such that when the vehicle is turned from a straight course of travel by manipulation of the front steering wheels, the pivoted axles 13, 14 will turn in the appropriate directions to enable the wheels on the pivoted axles to conform to the steering pattern established by the direction of forward motion of the front end of the vehicle. The steering axles 13 and 14 are actually turned by the resultant lateral thrust developed at the point of engagement of the tires on the ground engaging wheels with the ground. The spacing of the axles as well as the distances between the respective axles and the vertical turning axes are accurately determined so that an accurate progressive interrelation exists between the steering movement of the axles.

As previously stated, forces other than those encountered during normal steering are frequently applied to one or both axles during operation of the vehicle and these forces are substantially overcome by the hydraulic displacement system 20. In general, the above forces are in the form of side thrusts applied to the ground engaging wheels and may result from numerous different road conditions. In any event, the effect of unequal forces applied to the steering axles is eliminated or rendered negligible by the hydraulic stabilizer 20.

In addition to the so-called lateral forces or side thrusts, other situations may present themselves which require stabilization. For example, the elevation of one wheel on either axle may suddenly change for one reason or another. Under such conditions, resultant unequal application of external force, or for that matter unequal external reaction to the applied force, may tend to cause one axle to turn in opposition to the existing normal steering force or in opposition to the other steering axle. Such forces are resisted by the hydraulic stabilizing system 20 to a point where they are negligible insofar as their effect on the action of the vehicle running gear is concerned.

What I claim as my invention is:

1. In a vehicle having spaced pairs of ground engaging steering wheels respectively supported for turning movement about spaced vertically extending axes, stabilizing means connecting the wheels of one pair with the wheels of another pair, said means comprising a closed hydraulic displacement system filled with a hydraulic fluid and having spaced cylinders, pistons respectively slidably supported in the cylinders and respectively connected to the pairs of steering wheels by means including rods extending out of the cylinders at one end of the latter, a fluid conductor connecting the cylinders at one side of the pistons, a second fluid conductor connecting the cylinders at the opposite side of the pistons, a reservoir containing a supply of hydraulic fluid, aspirating valves having receiving chambers respectively in open communication with the conductors, air transfer chambers in said valves respectively connecting the receiving chambers to the reservoir, and a valve member in each valve normally positioned to close communication between the chambers of each valve and to open communication between the transfer chamber of each valve and said reservoir, thereby to displace air in said transfer chambers into said reservoir by hydraulic fluid from the latter, each valve member being operable by displacement of the fluid in the associated conductor to open communication between the chambers of each valve and to close communication between the transfer chambers of each valve and said reservoir, thereby to displace air in said receiving chambers into said transfer chambers by hydraulic fluid from the latter.

2. The structure defined in claim 1 wherein the receiving chambers of the valves are respectively serially connected to said conductors and wherein a baffle is located in each receiving chamber in a position to direct fluid toward the associated air transfer chamber.

3. The structure defined in claim 1 wherein the valve members have enlargements intermediate their ends respectively slidably supported in the air transfer chambers and coacting with the sides of the transfer chambers to provide a fluid bypass around the enlargements.

4. In a vehicle having spaced pairs of ground engaging steering wheels respectively supported for turning movement about spaced vertically extending axes, stabilizing means connecting the wheels of one pair with the wheels of another pair, said means comprising a closed hydraulic displacement system filled with a relatively non-compressible fluid and having spaced cylinders, pistons respectively slidably supported in the cylinders and respectively connected to the pairs of steering wheels by means including rods extending out of the cylinders at one end of the latter, a fluid conductor connecting the cylinders at one side of the pistons, a second fluid conductor connecting the cylinders at the opposite side of the pistons, a reservoir containing a supply of relatively non-compressible fluid, aspirating valves comprising receiving chambers respectively in open communication with the conductors, air transfer chambers respectively positioned in said valves directly above the receiving chambers and communicating with the latter and with the reservoir, vertically extending free floating valve plungers in said valves having enlargements intermediate the ends thereof respectively slidably engaging the inner walls of the transfer chambers and having provision for fluid to bypass the enlargements, each valve plunger normally positioned to close communication between the chambers of each valve and to open communication between the transfer chamber of each valve and said reservoir, thereby to displace air in said transfer chambers into said reservoir by hydraulic fluid from said reservoir, and each valve plunger being operable by displacement of fluid in the associated conductor to open communication between the chambers of each valve and to close communication between the transfer chambers and said reservoir, thereby to displace air in said receiving chambers into said transfer chambers by hydraulic fluid from the latter.

5. The structure defined in claim 4 wherein the lower ends of the valve plungers are exposed to the fluid passing through the respective receiving chambers of said valves and wherein said receiving chambers have baffles positioned to direct fluid upwardly toward the respective valve plungers.

6. Stabilizing means for spaced pairs of vehicle steering ground engaging wheels, comprising a closed hydraulic displacement system filled with a hydraulic fluid and having spaced cylinders, pistons respectively slidably supported in the cylinders and having operating rods respectively extending out of the cylinders at one end of the latter, a fluid conduit connecting the cylinders at one side of the pistons, a second fluid conduit connecting the cylinders at the opposite side of the pistons, a pair of aspirating valves having receiving chambers respectively in open communication with said conduits, air transfer chambers respectively positioned in said valves above the receiving chambers in communication with the latter, a hydraulic fluid reservoir communicating with the transfer chambers, a valve plunger in each valve normally positioned to close communication between the chambers of each valve and to open communication between the transfer chamber of each valve and said reservoir, thereby to displace air in said transfer chambers into said reservoir by hydraulic fluid from the latter, each valve plunger being operable by displacement of fluid in the associated conduit to open communication between the chambers of each valve and to close communication between the transfer chamber of each valve and said reservoir, thereby to displace air in said receiving chambers into said transfer chambers by hydraulic fluid from the latter.

7. Stabilizing means for spaced pairs of vehicle steering ground engaging wheels, comprising a closed hydraulic displacement system filled with a hydraulic fluid and having spaced cylinders, pistons respectively slidably supported in the cylinders and having operating rods respectively extending out of the cylinders at one end of the latter, a fluid conduit connecting the cylinders at one side of the pistons, a second fluid conduit connecting the cylinders at the opposite side of the pistons, a pair of aspirating valves having receiving chambers respectively serially connected in said conduits, air transfer chambers respectively positioned in said valves above the receiving chambers and connected to the receiving chambers through vertical passages, valve plungers respectively supported in the transfer chambers for vertical sliding movement and normally positioned with the lower ends thereof projecting into the passages for closing communication between the chambers of each valve, a hydraulic fluid reservoir connected to the transfer chambers at the top of the latter through second vertically extending passages aligned with the first passages for respectively receiving the upper ends of the valve plungers upon upward displacement of the latter to open communication between the chambers of each valve and to close communication between the transfer chambers and said reservoir, thereby to displace air in said receiving chambers into said transfer chambers by hydraulic fluid in the latter, said valve plungers in their normal position allowing for the displacement of air in said transfer chambers into said reservoir by hydraulic fluid from the latter.

8. The stabilizing means defined in claim 7 comprising baffles respectively projecting upwardly from the receiving chambers in positions to direct fluid upwardly against the valve plungers.

9. The stabilizing means defined in claim 7 having fluid connections between the respective receiving chambers and reservoir bypassing said valve plungers, and valves respectively located in said fluid bypass connections.

10. The stabilizing means defined in claim 7 wherein the length of the valve plungers is such that opposite ends thereof respectively project into the vertically aligned passages in intermediate positions of said plungers to prevent the flow of hydraulic fluid past the plungers.

11. The stabilizing means defined in claim 10 having fluid tight seals in each of said passages for engagement with the adjacent ends of the valve plungers.

12. In a vehicle having spaced pairs of ground engaging steering wheels respectively supported for turning movement about spaced vertically extending axes, stabilizing means connecting the wheels of one pair with the wheels of another pair, said means including a closed hydraulic displacement system filled with a hydraulic fluid and having cylinders, pistons respectively slidably supported in said cylinders, a fluid conductor connecting said cylinders at one side of said pistons, a second fluid conductor connecting said cylinders at the opposite side of said pistons, a reservoir containing a supply of hydraulic fluid, and aspirating valves respectively connecting said fluid conductors to said reservoir, each valve having means operable by the displacement of hydraulic fluid in the associated conductor for removing and transferring to said reservoir air accumulated in said conductor and replacing the same with hydraulic fluid from said reservoir.

13. In a vehicle having spaced pairs of ground engaging steering wheels respectively supported for turning movement about spaced vertically extending axes, stabilizing means connecting the wheels of one pair with the wheels of another pair, said means including a closed hydraulic displacement system filled with a hydraulic fluid and having cylinders, pistons respectively slidably supported in said cylinders, a fluid conductor connecting said cylinders at one side of said pistons, a second fluid conductor connecting said cylinders at the opposite side of said pistons, a reservoir containing a supply of hydraulic fluid, and aspirating valves respectively connecting said fluid conductors to said reservoir, each valve having a passage communicating with the associated conductor and with said reservoir, means in said valve normally closing communication between the passage in each valve and the associated conductor, said last-named means being operable by the displacement of fluid in the associated conductor for removing and transferring to said reservoir air accumulated in said conductor and replacing the same with hydraulic fluid from said reservoir.

14. In a vehicle having spaced pairs of ground engaging steering wheels respectively supported for turning movement about spaced vertically extending axes, stabilizing means connecting the wheels of one pair with the wheels of another pair, said means including a closed hydraulic displacement system filled with a hydraulic fluid and having cylinders, pistons respectively slidably supported in said cylinders, a fluid conductor connecting said cylinders at one side of said pistons, a second fluid conductor connecting said cylinders at the opposite side of said pistons, a reservoir containing a supply of hydraulic fluid, aspirating valves having air transfer chambers respectively connecting said conductors to said reservoir, means in each valve normally positioned to close communication between the chamber in each valve and the associated conductor and to open communication between the chamber of each valve and said reservoir, thereby to displace air in said chambers into said reservoir by hydraulic fluid from the latter, the means in each valve being operable by displacement of fluid in the associated conductor to open communication between the chamber of each valve and the associated conductor and to close communication between the chamber of each valve and said reservoir, thereby to displace air in said conductors into the associated chambers by hydraulic fluid from said reservoir.

References Cited in the file of this patent

UNITED STATES PATENTS

| | | |
|---|---|---|
| 1,700,394 | Young | Jan. 29, 1929 |
| 1,873,396 | Hallenbeck | Aug. 23, 1932 |
| 2,167,943 | Fox | Aug. 1, 1943 |
| 2,432,018 | Keehn | Dec. 2, 1947 |
| 2,632,462 | Selwyn | Mar. 24, 1953 |

FOREIGN PATENTS

| | | |
|---|---|---|
| 61,649 | Netherlands | Aug. 17, 1948 |